United States Patent
Wang et al.

(10) Patent No.: US 11,709,929 B2
(45) Date of Patent: Jul. 25, 2023

(54) INTERACTION METHOD AND APPARATUS

(71) Applicant: Huawei Technologies Co., Ltd., Shenzhen (CN)

(72) Inventors: Sishan Wang, Beijing (CN); Xiaona Zhao, Shenzhen (CN); Xinmiao Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 256 days.

(21) Appl. No.: 17/290,644

(22) PCT Filed: Oct. 23, 2019

(86) PCT No.: PCT/CN2019/112717
§ 371 (c)(1),
(2) Date: Apr. 30, 2021

(87) PCT Pub. No.: WO2020/088321
PCT Pub. Date: May 7, 2020

(65) Prior Publication Data
US 2021/0390173 A1 Dec. 16, 2021

(30) Foreign Application Priority Data

Nov. 1, 2018 (CN) .......................... 201811297407.X
Dec. 4, 2018 (CN) .......................... 201811472850.6

(51) Int. Cl.
| H04L 29/06 | (2006.01) |
| G06F 21/53 | (2013.01) |
| G06F 3/0484 | (2022.01) |
| G06F 21/62 | (2013.01) |
| G06T 11/20 | (2006.01) |

(52) U.S. Cl.
CPC ............ G06F 21/53 (2013.01); G06F 3/0484 (2013.01); G06F 21/62 (2013.01); G06T 11/20 (2013.01); G06F 2221/032 (2013.01)

(58) Field of Classification Search
CPC ................................ G06F 21/53; G06F 21/62
See application file for complete search history.

(56) References Cited

U.S. PATENT DOCUMENTS

| 10,609,026 B2 * | 3/2020 | Han ..................... H04W 12/086 |
| 2016/0041605 A1 * | 2/2016 | Hara ........................ G06F 1/26 |
| | | 713/324 |

(Continued)

FOREIGN PATENT DOCUMENTS

| CN | 104143065 A | 11/2014 |
| CN | 105528554 A | 4/2016 |

(Continued)

Primary Examiner — Jason K Gee
(74) Attorney, Agent, or Firm — Conley Rose, P.C.

(57) ABSTRACT

An interaction method includes receiving a service request from a client application (CA) installed on a terminal and that runs in a rich execution environment (REE), determining a trusted user interface (TUI) identifier, sending a TUI call instruction carrying the TUI identifier to a trusted execution environment (TEE) to instruct to draw an image based on the TUI template or the TUI function component to call a TUI to display the drawn image, receiving response information from the TEE, and executing a corresponding service procedure based on the response information.

20 Claims, 6 Drawing Sheets

(56) References Cited

U.S. PATENT DOCUMENTS

| | | | |
|---|---|---|---|
| 2016/0255073 A1 | 9/2016 | Broumas et al. | |
| 2017/0289193 A1 | 10/2017 | Ye et al. | |
| 2018/0276352 A1 | 9/2018 | Yao et al. | |
| 2021/0240807 A1* | 8/2021 | Wang | G06Q 20/40145 |

FOREIGN PATENT DOCUMENTS

| | | |
|---|---|---|
| CN | 106228072 A | 12/2016 |
| CN | 106547618 A | 3/2017 |
| CN | 106547633 A | 3/2017 |
| CN | 106548077 A | 3/2017 |
| CN | 106878231 A | 6/2017 |
| CN | 108200078 A | 6/2018 |
| CN | 108229956 A | 6/2018 |
| CN | 108282466 A | 7/2018 |
| CN | 108616352 A | 10/2018 |
| CN | 109766152 A | 5/2019 |
| EP | 3862875 A1 | 8/2021 |
| WO | 2017156784 A1 | 9/2017 |

\* cited by examiner

INTERACTION METHOD AND APPARATUS

CROSS-REFERENCE TO RELATED APPLICATIONS

This application is a U.S. National Stage of International Patent Application No. PCT/CN2019/112717 filed on Oct. 23, 2019, which claims priority to Chinese Patent Application No. 201811472850.6 filed on Dec. 4, 2018, which claims priority to Chinese Patent Application No. 201811297407.X filed on Nov. 1, 2018, all of which are hereby incorporated by reference in their entireties.

TECHNICAL FIELD

Embodiments of the present invention relate to the field of computer technologies, and in particular, to an interaction method and an apparatus.

BACKGROUND

A trusted user interface (Trusted User Interface, TUI) is a security function provided by a trusted execution environment (Trusted Execution Environment, TEE) operating system (Operating Systems, OS), and can provide a trusted interface for secure interaction with a user for each trusted application (Trusted Application, TA) running in a TEE, to ensure that sensitive data to be exchanged between the TA and the user is protected against attack from another application or malicious software, and further significantly improve service security. A secure element (Secure Element, SE) is a hardware unit with an independent processor and an anti-hardware attack capability, can provide a secure running environment for an applet (Applet) running in the secure element, and can ensure security and confidentiality of an asset stored in the secure element. Therefore, some applets, for example, a payment applet, a bus applet, and a USB key, requiring relatively high security are all deployed in SEs. However, the SE does not have a capability of interacting with users. To resolve the foregoing problem, the industry proposes a TEE+SE security architecture, to be specific, the TEE provides a TUI capability, and all security and cryptography-related operations are performed in the SE. Because the TUI in the TEE is exposed only to the TA in the TEE, when an applet in the SE needs to interact with a user in some sensitive service scenarios, a dedicated TA needs to be installed in the TEE by a service party to fulfill a corresponding TUI function and adjust a service running time sequence. In the foregoing method, different TAs may need to be developed for different services, and therefore service development difficulty is increased.

SUMMARY

Embodiments of the present invention disclose an interaction method and an apparatus, to reduce service development difficulty.

According to a first aspect, an interaction method is disclosed. The method is applied to an SE disposed in a terminal, and includes: receiving a service request from a client application (Client Application, CA); determining a to-be-used TUI identifier; sending a TUI call instruction carrying the TUI identifier to a TEE, where the TUI call instruction may be further used to indicate the TEE to obtain a stored TUI template or TUI function module corresponding to the TUI identifier, drawing an image based on the obtained TUI template or the TUI function module, and calling a TUI to display the drawn image; receiving response information from the TEE; and executing a corresponding service procedure based on the response information. It can be learned that, on a terminal with a TEE+SE security architecture, an applet in an SE can use a TUI capability in a TEE that is exposed by using a TUI template or a TUI function module, without a need to develop different TAs for different services, and therefore service development difficulty can be reduced. The CA is an application that is installed in the terminal and that runs in a rich execution environment (Rich Execution Environment, REE), and the response information is information entered by a user for the displayed image by using the TUI or information generated by the TEE based on interaction between the user and the image displayed by the TUI.

In an embodiment, the TUI call instruction further carries a parameter required by the TUI template or the TUI function module corresponding to the TUI identifier. The TUI call instruction may be further used to indicate the TEE to draw an image based on the obtained TUI template or TUI function module and the parameter, so that a complete image can be drawn.

In an embodiment, when the TUI identifier corresponds to a TUI template, it may be first determined whether there is a binding relationship between an applet and the TUI template that is stored in the TEE and that corresponds to the TUI identifier. The TUI call instruction carrying the TUI identifier is sent to the TEE only when it is determined that there is a binding relationship between the applet and the TUI template that is stored in the TEE and that corresponds to the TUI identifier. In this way, it can be ensured that the TUI call instruction carrying the TUI identifier is sent to the TEE only when the TUI template corresponding to the TUI identifier is stored in the TEE and the TUI template is available to the service applet, so that unnecessary processing processes can be reduced. The applet is an applet receiving the service request.

In an embodiment, when it is determined that there is a binding relationship between the applet and the TUI template that is stored in the TEE and that corresponds to the TUI identifier, it may be further determined whether the TUI template corresponding to the TUI identifier is tampered with, and the TUI call instruction carrying the TUI identifier is sent to the TEE only when it is determined that the TUI template corresponding to the TUI identifier is not tampered with. In this way, it can be ensured that the TUI template corresponding to the TUI identifier is an available TUI template, so that unnecessary processing processes can be reduced.

In an embodiment, the TUI call request further carries an applet identifier of an applet receiving the service request, and the TUI call instruction may be further used to indicate the TEE to determine whether there is a binding relationship between the applet corresponding to the applet identifier and the obtained TUI template and draw an image based on the obtained TUI template only when it is determined that there is a binding relationship between the applet corresponding to the applet identifier and the obtained TUI template. In this way, it can be ensured that the obtained TUI template is a TUI template that is available to the applet.

In an embodiment, the TUI call instruction may be further used to indicate the TEE to further determine, when the TEE determines that there is a binding relationship between the applet corresponding to the applet identifier and the obtained TUI template, whether the obtained TUI template is tampered with and draw an image based on the obtained TUI template only when it is determined that the obtained TUI template is not tampered with. In this way, it can be ensured that the obtained TUI template is an available TUI template.

In an embodiment, after the service request from the CA is received, it may be first determined whether a TUI service of the SE is activated, and the to-be-used TUI identifier is determined only when it is determined that the TUI service is activated. In this way, it can be ensured that the SE can use the TUI in the TEE.

In an embodiment, the service request may carry a service type, it may be first determined, based on the service type, whether the TUI needs to be used, and it is determined whether the TUI service of the SE is activated or the to-be-used TUI identifier is determined only when it is determined that the TUI needs to be used. In this way, it can be ensured that the exposed TUI in the TEE is used only when the TUI needs to be used, so that unnecessary processing processes can be reduced.

According to a second aspect, an interaction method is disclosed. The method is applied to a TEE in a terminal, and includes: receiving a TUI call instruction that is from an SE and that carries a TUI identifier; obtaining a stored TUI template or TUI function module corresponding to the TUI identifier; drawing an image based on the obtained TUI template or TUI function module; calling a TUI to display the drawn image; and sending response information to the SE, where the response information is used to indicate the SE to execute a corresponding service procedure based on the response information. It can be learned that, on a terminal with a TEE+SE security architecture, a TEE can expose a TUI capability to an applet in an SE by using a TUI template or a TUI function module, without a need to develop different TAs for different services, and therefore service development difficulty can be reduced. The response information is information entered by a user for the displayed image by using a TUI or information generated based on interaction between the user and the image displayed by the TUI.

In an embodiment, the TUI call instruction may further carry a parameter, and an image may be drawn based on the obtained TUI template or TUI function module and the parameter, so that a complete image can be drawn.

In an embodiment, the TUI template stored in the TEE may be a TUI template from the SE, may be a TUI template from a server, or may be a TUI template preset in the TEE.

In an embodiment, when the TUI template is a TUI template from the SE or the server, the TUI call request may further carry an applet identifier of an applet that is in the SE and that receives a service request. It may be first determined whether there is a binding relationship between the obtained TUI template and the applet corresponding to the applet identifier, and an image is drawn based on the obtained TUI template only when it is determined that there is a binding relationship between the obtained TUI template and the applet corresponding to the applet identifier. In this way, it can be ensured that the obtained TUI template is a TUI template that is available to the applet.

In an embodiment, when it is determined that there is a binding relationship between the obtained TUI template and the applet corresponding to the applet identifier, it may be further determined whether the obtained TUI template is tampered with, and an image is drawn based on the obtained TUI template only when it is determined that the obtained TUI template is not tampered with. In this way, it can be ensured that the obtained TUI template is an available TUI template.

According to a third aspect, an SE is disclosed. The SE is disposed in a terminal, and includes:

a receiving unit, configured to receive a service request from a CA, where the CA is an application that is installed in the terminal and that runs in an REE;

a determining unit, configured to determine a to-be-used TUI identifier;

a sending unit, configured to: send a TUI call instruction carrying the TUI identifier selected by the selection unit to a TEE, where the TUI call instruction is used to indicate the TEE to obtain a stored TUI template or TUI function module corresponding to the TUI identifier, draw an image based on the TUI template or the TUI function module, and call a TUI to display the image, where the receiving unit is further configured to receive response information from the TEE, where the response information is information that is entered by a user for the image by using the TUI or information generated by the TEE based on interaction between the user and the image displayed by the TUI; and an execution unit, configured to execute a corresponding service procedure based on the response information received by the receiving unit.

In an embodiment, the TUI call instruction further carries a parameter, and the parameter is a parameter required by the TUI template or the TUI function module; and that the TUI call instruction is used to indicate the TEE to draw an image based on the TUI template or the TUI function module includes:

the TUI call instruction is used to indicate the TEE to draw an image based on the TUI template or the TUI function module and the parameter.

In an embodiment, the SE further includes:

a first determining unit, configured to determine whether there is a binding relationship between an applet and the TUI template that is stored in the TEE and that corresponds to the TUI identifier, where when the first determining unit determines that there is a binding relationship between the applet and the TUI template that is stored in the TEE and that corresponds to the TUI identifier, the sending unit sends the TUI call instruction carrying the TUI identifier to the TEE, and the applet is an applet receiving the service request.

In an embodiment, the SE further includes:

a second determining unit, configured to: when the first determining unit determines that there is a binding relationship between the applet and the TUI template that is stored in the TEE and that corresponds to the TUI identifier, determine whether the TUI template corresponding to the TUI identifier determined by the determining unit is tampered with, where when it is determined that the TUI template corresponding to the TUI identifier is not tampered with, the sending unit sends the TUI call instruction carrying the TUI identifier to the TEE.

In an embodiment, the TUI call request further carries an applet identifier of an applet receiving the service request, and the TUI call instruction is further used to indicate the TEE to determine whether there is a binding relationship between the applet corresponding to the applet identifier and the TUI template and draw an image based on the TUI template when it is determined that there is a binding relationship between the applet corresponding to the applet identifier and the TUI template.

In an embodiment, the TUI call instruction is further used to indicate the TEE to determine, when the TEE determines that there is a binding relationship between the applet corresponding to the applet identifier and the TUI template, whether the TUI template is tampered with and draw an image based on the TUI template when it is determined that the TUI template is not tampered with.

In an embodiment, the SE further includes:

a third determining unit, configured to: after the receiving unit receives the service request from the CA, determine whether a TUI service of the SE is activated, where when the third determining unit determines that the TUI service is activated, the determining unit determines the to-be-used TUI identifier.

In an embodiment, the service request carries a service type, and the SE further includes:

a fourth determining unit, configured to determine, based on the service type received by the receiving unit, whether the TUI needs to be used, where when it is determined that the TUI needs to be used, the third determining unit determines whether the TUI service of the SE is activated, or the determining unit determines the to-be-used TUI identifier.

According to a fourth aspect, a TEE is disclosed. The TEE is a TEE in a terminal, and includes:

a receiving unit, configured to receive a TUI call instruction from an SE, where the TUI call instruction carries a TUI identifier;

an obtaining unit, configured to obtain a stored TUI template or TUI function module corresponding to the TUI identifier received by the receiving unit;

a drawing unit, configured to draw an image based on the TUI template or the TUI function module obtained by the obtaining unit;

a display unit, configured to call a TUI to display the image drawn by the drawing unit; and a sending unit, configured to send response information to the SE, where the response information is information entered by a user by using the TUI for the image displayed by the display unit or generated based on interaction between the user and the image displayed by the display unit by using the TUI, and the response information is used to indicate the SE to execute a corresponding service procedure based on the response information.

In an embodiment, the TUI call instruction further carries a parameter; and the drawing unit is specifically configured to draw an image based on the TUI template or the TUI function module and the parameter.

In an embodiment, the TUI template stored in the TEE is:

a TUI template from the SE; or a TUI template from a server; or a preset TUI template.

In an embodiment, when the TUI template is a TUI template from the SE or the server, the TUI call request further carries an applet identifier of an applet that is in the SE and that receives a service request; and the TEE further includes:

a first determining unit, configured to determine whether there is a binding relationship between the TUI template obtained by the obtaining unit and the applet corresponding to the applet identifier, where when it is determined that there is a binding relationship between the TUI template and the applet corresponding to the applet identifier, the drawing unit draws an image based on the TUI template.

In an embodiment, the TEE further includes:

a second determining unit, configured to: when the first determining unit determines that there is a binding relationship between the TUI template and the applet corresponding to the applet identifier, determine whether the TUI template obtained by the obtaining unit is tampered with, where when it is determined that the TUI template is not tampered with, the drawing unit draws an image based on the TUI template.

According to a fifth aspect, an SE is disclosed. The SE is disposed in a terminal, and the SE includes a processor, a memory, and a transceiver. The memory is configured to store program code, the processor is configured to execute the program code, and the transceiver is configured to communicate with another communications device or apparatus. When the processor executes the program code stored in the memory, the processor performs the interaction method disclosed in any one of the first aspect or the possible implementations of the first aspect.

According to a sixth aspect, a TEE is disclosed. The TEE is disposed in a terminal, and the SE includes a processor, a memory, a transceiver, and a display. The memory is configured to store program code, the processor is configured to execute the program code, the transceiver is configured to communicate with another communications device or apparatus, and the display is configured to display information. When the processor executes the program code stored in the memory, the processor performs the interaction method disclosed in any one of the second aspect or the possible implementations of the second aspect.

According to a seventh aspect, a readable storage medium is disclosed. The readable storage medium stores programs, and when the programs run, the interaction method disclosed in any one of the first aspect or the embodiments of the first aspect is implemented, or the interaction method disclosed in any one of the second aspect or the embodiments of the second aspect is implemented.

DESCRIPTION OF EMBODIMENTS

Figure 1:
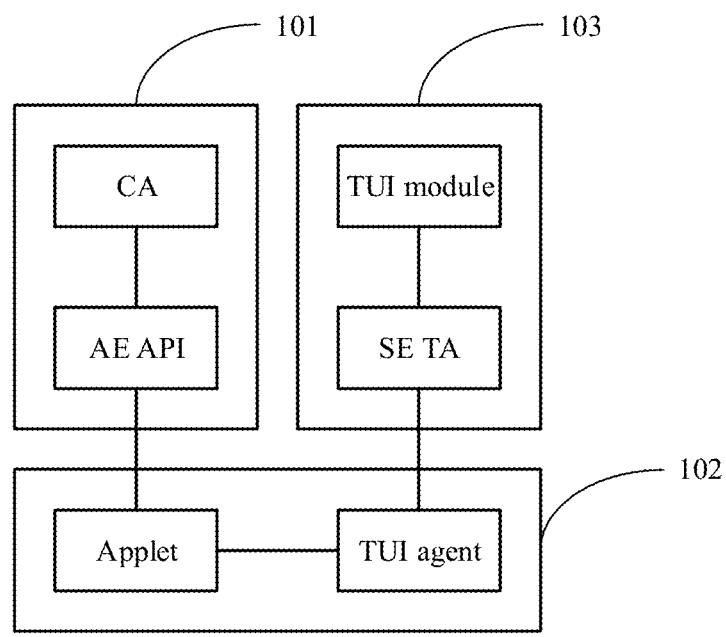
FIG. 1 is a schematic diagram of a system architecture according to an embodiment of the present invention.

Embodiments of the present invention disclose an interaction method and an apparatus, to reduce service development difficulty. Detailed descriptions are provided below.

To facilitate better understanding of the interaction method and the apparatus disclosed in the embodiments of the present invention, the following first describes terms used in the embodiments of the present invention. A rich execution environment, or REE for short, generally means a running environment, for example, an Android operating system, without a specific security function. A TEE is a running environment that coexists with the REE in an intelligent terminal. Supported by hardware, the TEE is isolated from the REE, has a security capability, and can withstand a software attack that tends to occur on a common REE side. The TEE has running space of the TEE, and harsh protection measures are defined. Therefore, the TEE has a higher security level than the REE, and can protect assets (assets) such as data and software in the TEE from software attacks and specific types of security threats. Only authorized security software can be executed in the TEE. In addition, the TEE also protects confidentiality of resources and data of the security software. Compared with the REE, the TEE can better protect data and resource security because of a protection mechanism, for example, isolation and authority control, of the TEE.

A TA is an application running in the TEE, and can provide a security related service for a CA running outside the TEE. Generally, the CA is an application in the REE. However, when a TA is called by some TAs, the TAs that actively initiate the call may also be used as CAs. The CA calls the TA by using a client (Client) application programming interface (Application Programming Interface, API), and indicates the TA to perform a corresponding security operation.

An SE is a hardware unit with a tamperproofing capability and an anti-hardware attack capability, has an independent processor, can provide a secure running environment for an applet (Applet) running in the SE, and can ensure security and confidentiality of an asset stored in the SE. Common forms of the SE include a universal integrated circuit card (Universal Integrated Circuit Card, UICC) SE, an embedded (embedded) SE, an SE integrated into a system on chip (System on Chip, SoC), and the like.

A TUI is a trusted interface provided by the TEE for secure interaction with a user, to ensure that sensitive data to be exchanged between the TA and the user is not attacked by another application or malicious software and input content and output (that is, display) content are not obtained by the REE or even another TA. The global platform (Global Platform) standardizes APIs used by the TA to call the TUI, so that TA developers can use these APIs to develop the TUI. By using the TUI, the most basic security user interaction functions such as security display, security input, and security indication marking can be fulfilled.

To facilitate better understanding of the interaction method and the apparatus disclosed in the embodiments of the present invention, the following first describes a system architecture used in the embodiments of the present invention. FIG. 1 is a schematic diagram of a system architecture according to an embodiment of the present invention. As shown in FIG. 1, the system architecture may include an REE 101, an SE 102, and a TEE 103. The REE 101 includes one or more CAs and open mobile (Open Mobile, OM) APIs. The SE 102 includes one or more applets and TUI agent (agent) modules. The TEE 103 includes one or more TAs, SE TAs, and TUI modules. The CA in the REE 101 initiates a service request to the applet in the SE 102 by using the OM API. After receiving the service request, the applet in the SE 102 sends a TUI call request to the TUI agent in the SE 102. After receiving the TUI call request, the TUI agent in the SE 102 sends a TUI call instruction to the SE TA in the TEE 103. After receiving the TUI call instruction, the SE TA in the TEE 103 reads a corresponding TUI template or TUI function module, and draws an image based on the TUI template or the TUI function module. The TUI module displays the drawn image, and receives information or an operation entered by a user for the displayed image. The SE TA sends response information to the TUI agent in the SE 102. The TUI agent in the SE 102 sends the response information to the applet in the SE 102, and the applet in the SE 102 executes a corresponding service procedure based on the response information.

The TUI agent in the SE may provide a TUI capability call interface for each applet in the SE, to expose a TUI capability in the TEE in the terminal to each applet in the SE. A terminal manufacturer, a TEE manufacturer, or an SE manufacturer may develop the TUI agent in the SE and the SE TA in the TEE and implement internal interaction between the TUI agent in the SE and the SE TA in the TEE. The internal implementation may mean that the SE can call the TUI capability in the TEE, abstract and encapsulate the TUI capability, and expose the TUI capability to the applet in the SE by using the call interface.

Figure 2:
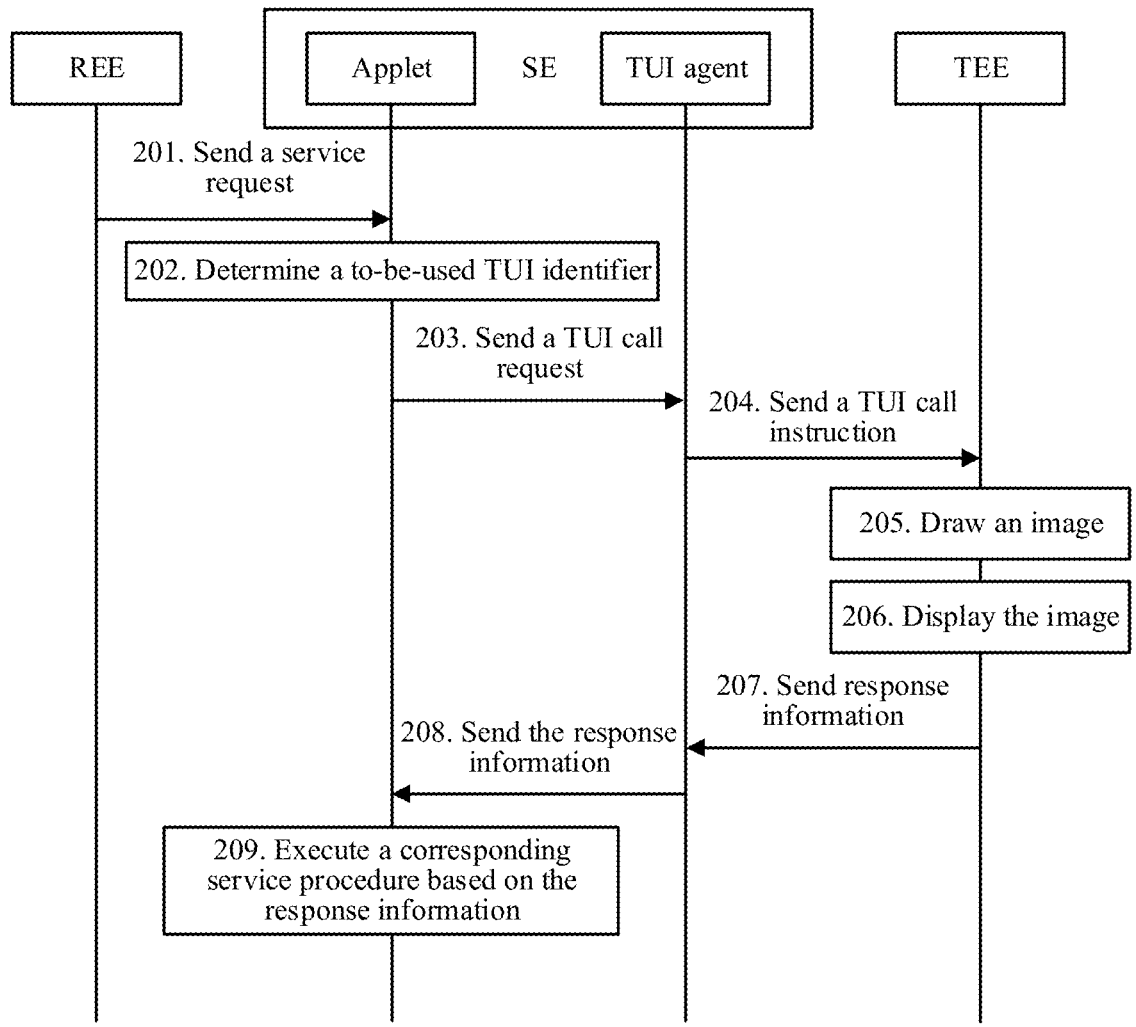
FIG. 2 is a schematic flowchart of an interaction method according to an embodiment of the present invention.

Based on the system architecture shown in FIG. 1, FIG. 2 is a schematic flowchart of an interaction method according to an embodiment of the present invention. As shown in FIG. 2, the interaction method may include the following steps.

201. A CA in an REE sends a service request to an applet in an SE by using an OM API.

In this embodiment, when the CA in the REE needs the applet in the SE to perform some service operations, the CA in the REE sends the service request to the applet in the SE by using the OM API. The service request may carry service information, and the service information may indicate which service the service is. For example, service information in a signature service request indicates that the CA requests the applet in the SE to perform a signature operation on entered service data.

202. The applet in the SE determines a TUI identifier that needs to be used.

In this embodiment, after receiving the service request from the REE, when determining that a TUI service of the SE is available (that is, activated), the applet in the SE determines, based on the service request, the TUI identifier that needs to be used. The TUI identifier is used to identify a TUI template or a TUI function module that needs to be used.

In this embodiment, when the TUI identifier is used to identify a to-be-used TUI template, and a TUI template stored in the TEE is a TUI template from the SE or a server, an SE TA may bind the TUI template to the applet in the SE when deploying the TUI template in a TEE. Therefore, after determining the to-be-used TUI identifier, the applet in the SE may determine whether there is a binding relationship between the applet and the TUI template that is stored in the TEE and that corresponds to the TUI identifier, in other words, determine whether the TUI template corresponding to the TUI identifier exists in TUI templates stored in the TEE. When the applet in the SE determines that the TUI template corresponding to the TUI identifier exists in the TUI templates stored in the TEE, step 203 may be directly performed. Specifically, the applet in the SE determines, after sending a query request to a TUI agent, whether the TUI template corresponding to the TUI identifier exists. In an implementation, the query request includes the TUI identifier, and the TUI agent returns a response indicating whether the template corresponding to the TUI identifier exists. In another implementation, the applet sends the query request, and the TUI agent returns identifiers of all TUI templates associated with the applet and stored in the TEE, and the applet determines whether the template corresponding to the to-be-used TUI identifier exists.

Still further, when returning the identifiers of all the TUI templates associated with the applet and stored in the TEE, the TUI agent may further return hash values of the TUI templates associated with the applet. A hash value of the TUI template corresponding to the TUI identifier is stored in the applet. The hash value may be compared with the obtained hash value of the TUI template that is stored in the TEE and that corresponds to the TUI identifier, to determine whether a first digest is the same as a second digest. When a comparison result is "same", it indicates that the TUI template is not tampered with, and step 203 is performed. When it is determined that the TUI template corresponding to the TUI identifier does not exist in the TUI templates stored in the TEE, or the comparison result is "different", it indicates that the TUI template does not exist in the TEE or the TUI template is tampered with, and the service ends.

In addition, information about the TUI template corresponding to the TUI identifier may be obtained during initialization. The information about the TUI template corresponding to the TUI identifier may include identification information, a hash value, and the like of the TUI template corresponding to the TUI identifier. In addition, the applet may also obtain, from the SE TA in the TEE, information about a parameter required by the TUI template corresponding to the TUI identifier, so that the applet sends the parameter corresponding to the information about the parameter to the SE TA.

203. The applet in the SE sends a TUI call request including the determined TUI identifier to the TUI agent in the SE.

In this embodiment, after determining the TUI identifier, the applet in the SE may send the TUI call request including the determined TUI identifier to the TUI agent in the SE. When a parameter is required by the TUI template or the TUI function module corresponding to the TUI identifier, the TUI call request may further include a required parameter. The parameter may be provided by the applet, may be sent by the CA by using the service request, or may be jointly provided by the applet and the CA. In addition, the TUI call request may further include an applet identifier of the applet, and the applet identifier is used to perform verification on a binding relationship between the applet and the TUI template. A format of the TUI call request may be I applet identifier I TUI identifier I parameter 1 I parameter 2 I . . . I, or may be I applet identifier I TUI identifier 1 I parameter 1 I TUI identifier 2 I parameter 2. The applet in the SE may send the TUI call request to the TUI agent by using an API interface provided by the TUI agent, or may send the TUI call request to the TUI agent by using a communications interface that is of the applet and that is provided by a chip operating system. In addition, the TUI agent may further send information such as a stored TUI identifier and a hash value of a corresponding TUI template to the applet in the SE in response to the query request in step 202.

In this embodiment, when the TUI identifier is used to identify a TUI template, after receiving the TUI call request from the applet in the SE, the TUI agent may first determine whether there is a binding relationship between the applet and the TUI template that is stored in the TEE and that corresponds to the TUI identifier, and may determine whether the TUI template corresponding to the TUI identifier exists in the TUI templates stored in the TEE, and determine whether there is a binding relationship between the applet and the TUI template corresponding to the TUI identifier. The TUI agent may first determine whether the TUI template corresponding to the TUI identifier exists in the TUI templates stored in the TEE, and when determining that the TUI template corresponding to the TUI identifier exists in the TUI templates stored in the TEE, the TUI agent further determines whether there is a binding relationship between the TUI template corresponding to the TUI identifier and the applet. When it is determined that there is a binding relationship between the TUI template corresponding to the TUI identifier and the applet, it indicates that the applet has permission to call the TUI template corresponding to the TUI identifier, and step 204 may be performed. When it is determined that the TUI template corresponding to the TUI identifier does not exist in the TUI templates stored in the TEE or there is no binding relationship between the TUI template corresponding to the TUI identifier and the applet, it indicates that no to-be-used TUI template exists in the TEE or a to-be-used TUI template for a service of the applet cannot be used or the TUI template is tampered with, and the service ends. Specifically, in a process of initialization or startup of the SE, the TUI agent obtains identifiers of the TUI templates stored in the TEE and binding relationships between the templates and each applet, and determines that the TUI service is available (in an active state). After receiving the TUI call request that is sent by the applet and that includes the TUI identifier, the TUI agent may determine whether the TUI template corresponding to the identifier exists, determine that there is a binding relationship between the identifier and the applet, and then perform step 204.

Still further, when it is determined that there is a binding relationship between the TUI template corresponding to the TUI identifier and the applet, it may be further determined whether the TUI template corresponding to the TUI identifier is tampered with. Specifically, the applet may store the hash value of the TUI template corresponding to the TUI identifier, and the TUI call request sent to the TUI agent may include the hash value. After determining that the template exists and there is a binding relationship between the template and the applet, the TUI agent compares the hash value that is of the TUI template corresponding to the TUI identifier and that is obtained from the TEE and stored in the TEE with the hash value sent by the applet in the SE. When a comparison result is "same", it indicates that the TUI template is not tampered with, and step 204 is performed. When the comparison result is "different", it indicates that the to-be-used TUI template in the TEE is tampered with, and the service ends.

204. The TUI agent in the SE sends a TUI call instruction carrying the TUI identifier to the SE TA in the TEE.

In this embodiment, after receiving the TUI identifier sent by the applet in the SE, the TUI agent in the SE may directly send the TUI call instruction carrying the TUI identifier to the SE TA in the TEE. The TUI call instruction may be generated by the TUI agent. The TUI call instruction generated by the TUI agent may be generated based on a preset communication protocol format, and a format of the generated TUI call instruction may be the same as or different from a format of the TUI call request. The communication connection actively initiated by the SE to the TEE may be triggered through inter processor communication (inter processor communication, IPC) or another underlying mechanism.

205. The SE TA in the TEE obtains the TUI template or the TUI function module corresponding to the TUI identifier, and draws an image based on the obtained TUI template or TUI function module.

In this embodiment, after receiving the TUI call instruction from the TUI agent in the SE, the SE TA in the TEE obtains, based on the TUI identifier in the instruction, the TUI template or the TUI function module that is stored in the TEE and that corresponds to the identifier. Then the SE TA may directly draw an image based on the obtained TUI template or TUI function module. When the TUI call instruction carries a parameter, the parameter may be first written into the TUI template or the TUI function module, and then an image is drawn. The TUI function module may be a function module such as a keyboard, a display box, a button, a biometric authentication module, or a two-dimensional code. For example, in a signature scenario, it is determined that a text display box, an image display box, a button, and a biometric authentication module are to be used for a service in the SE, and a call request is sent to the TUI agent to call corresponding TUI function modules. The call request carries parameters required by the modules.

In this embodiment, after receiving the call instruction, the SE TA combines the text display box, the image display box, the button, and the biometric authentication module based on the TUI function module corresponding to the TUI identifier, and provides the parameters to the modules, so that information to be determined by a user is displayed in the text display box, a security indication mark is displayed in the image display box, the user determines, by using the button, whether the information is correct, and when the user chooses a button representing "Yes", the biometric authentication module is called to perform identity authentication.

In this embodiment, when the TUI identifier is used to identify a TUI template, the TUI template stored in the SE TA may be a TUI template from the applet in the SE (an applet-defined template, where the template is stored in the TEE by using the TUI agent in the SE), or may be a dynamically deployed and stored TUI template from the server (an applet-defined template, where the template is directly stored in the TEE through remote management by the TEE), or may be a TUI template preset in the SE TA.

In this embodiment, the TUI call instruction may further carry an applet identifier of the applet that is in the SE and that receives the service request. After obtaining the TUI template corresponding to the TUI identifier, the SE TA may first determine whether there is a binding relationship between the obtained TUI template and the applet corresponding to the applet identifier. When determining that there is a binding relationship between the obtained TUI template and the applet corresponding to the applet identifier, the SE TA may directly draw an image based on the obtained TUI template. Alternatively, the SE TA may further determine, based on the hash value that is of the TUI template and that is included in the instruction, whether the obtained TUI template is tampered with, and when determining that the obtained TUI template is not tampered with, the SE TA draws an image based on the obtained TUI template. A specific determining process is similar to the foregoing determining process of the TUI agent, and details are not described herein again.

In this embodiment, the TUI call instruction may further carry authentication information. Authentication may be first performed on the authentication information, and step 205 is performed only after the authentication succeeds. If the authentication fails, the current service ends. The authentication information may be generated when the TUI template is deployed. Specifically, the authentication information may be a call credential generated by the SE TA, and the template can be called only when the call request carries the call credential. Alternatively, the authentication information may be a call key generated by the SE TA. When generating the TUI call instruction, the TUI agent in the SE needs to generate the authentication information by using the call key. After authentication performed by the SE TA on the authentication information succeeds, call of the TUI template is allowed.

In this embodiment, scenarios in which a security service established in the SE uses a TUI are basically fixed, for example, information display, signature verification, password input, two-dimensional code display, and a biometric recognition interface. Content displayed in these scenarios is relatively fixed, and basically, no complex operation, for example, animation, requiring frequent refreshing of screen content is involved. Therefore, a TUI capability may be exposed in the form of the TUI template, and different TUI templates are deployed for different scenarios (the TUI template may be personalized based on a service). In this way, the TUI capability can be called in the SE for a service through template call to meet service requirements in different scenarios.

Figure 8:
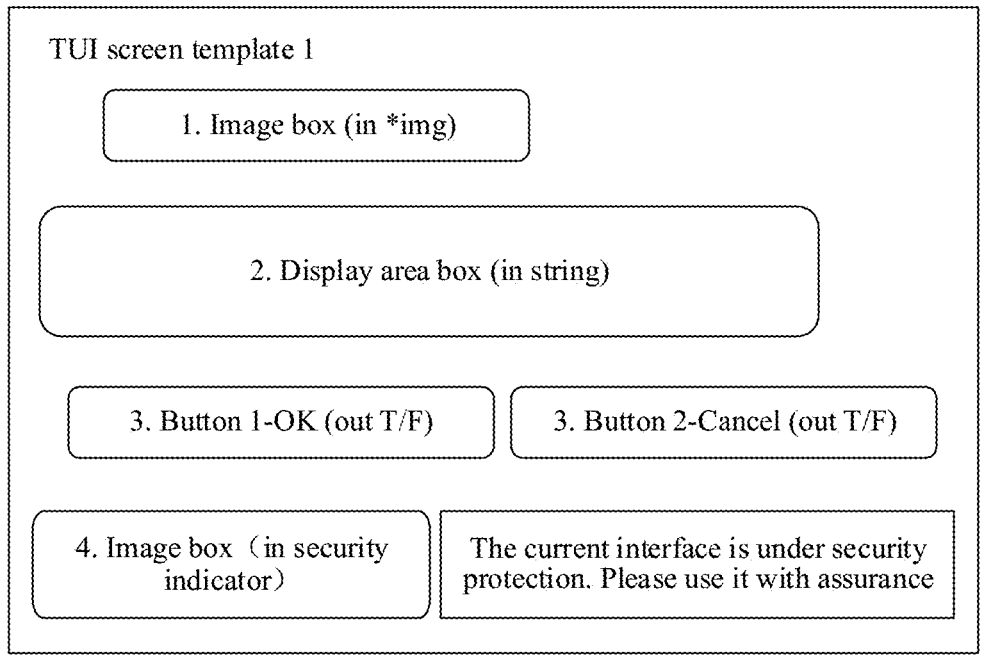
FIG. 8 is a schematic diagram of a TUI template according to an embodiment of the present invention.

In this embodiment, different TUI templates may be generated for different scenarios, and an attribute, for example, a size, a location, a color, whether an input argument is required, whether an output argument is generated, and a data type of each parameter, of each component (submodule) in the TUI template may be further defined. FIG. 8 is a schematic diagram of a TUI template according to an embodiment of the present invention. As shown in FIG. 8, the TUI template includes four components (submodules). A component 1 is an image box component, where an image or an image index needs to be provided as an input parameter, and there is no output. A component 2 is a text display component, where a section of character strings needs to be provided as an input parameter, and there is no output. A component 3 is a button component, where no input is required, and Yes/No or another form of output is output based on an obtained event determined or canceled by the user. For a component 4, a security indicator (Security Indicator) needs to be provided as an input parameter.

In this embodiment, a TEE manufacturer may encapsulate a TUI function for the TUI, and provide a UI design tool/component library to enable an applet manufacturer to customize a TUI template. For different scenarios, different components and corresponding attributes of the components are selected, and input/output and the like required by the components are set. After the applet manufacturer completes layout and design of the TUI template, the TEE manufacturer/UI design tool is responsible for generating corresponding TEE executable TUI template code. The TUI template code may comply with a TUI API specification. The TUI capability can be called by using a TUI API provided that an input parameter required by each TUI template is filled in a corresponding location in the template code. The TUI template (TUI template code) is deployed in the TEE in the foregoing manner for storage.

In this embodiment, during component design and development, richer attributes of a component may be provided for setting by a service party (the applet manufacturer). For example, for a button component, a color, a font, a pressing effect, and the like may also be designed in addition to button display content. After the service party determines to add a button component to a UI interface, the service party may make a deeper design based on optional attributes of the component in addition to determining a location. For a user input box component, in addition to attributes such as a background color and a font, a display effect attribute may be designed, for example, for this part, a plaintext is always displayed or a plaintext is displayed for a short time.

In this embodiment, based on common use scenario, TUI templates such as a display determining template, a signature determining template, a signature authentication template with identity authentication (a personal identification number (Personal Identification Number, PIN), biometric authentication, or the like), a two-dimensional code display template, a security selection template, and a touchscreen event obtaining template may be separately designed. After the TUI template is generated, the service party or the TEE manufacturer may perform operations such as signing and encryption on the TUI template, and generate a unique identifier in the TEE for the TUI template.

In this embodiment, the TUI template may also be a general template or function module in each scenario that is provided by the TEE manufacturer. The applet manufacturer directly uses, based on a service requirement, the TUI general template or function module provided by the TEE.

In this embodiment, the TUI template needs to be deployed in the TEE. A server corresponding to the SE TA in the TEE may deploy the TUI template in the SE TA through remote management. For the remote management, an existing TEE standard management protocol such as TMF or OTrP may be used, or a manufacturer proprietary protocol may be used.

In this embodiment, the TUI template may be deployed in the SE together with the applet in the SE, and the applet in the SE stores the TUI template in the SE TA in the TEE by using the TUI agent in the SE.

In this embodiment, after receiving the TUI template (in a plurality of possible manners), the SE TA in the TEE may bind the TUI template to the applet in the SE. The SE TA may further send a call credential to the SE, and call is allowed only when the TUI call instruction includes the call credential. The TUI template may be encrypted and stored, and a key may be stored in the applet or the TUI agent in the SE. To call the TUI template, a decryption key also needs to be transferred. An attribute of the SE TA may be set to a plurality of instances (multiple instant). To be specific, when different applets in the SE call the TUI by using the TUI agent in the SE, different SE TA instances are generated. In this way, it can be further ensured that TUI template data of different applets is directly isolated.

Figure 9:
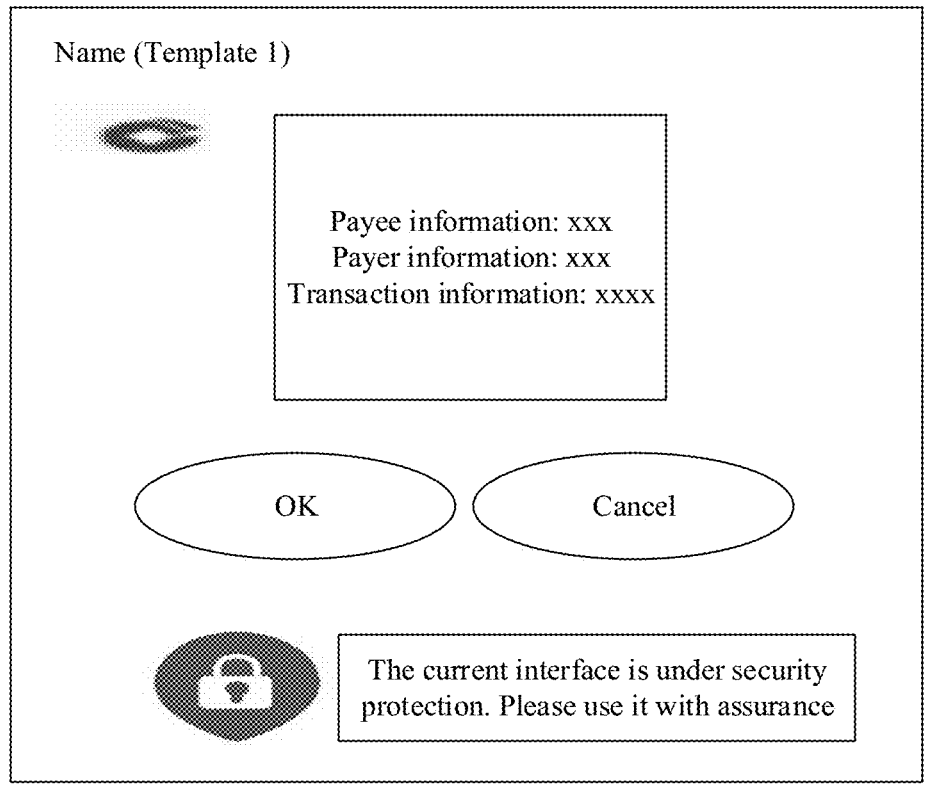
FIG. 9 is a schematic diagram of a drawn image according to an embodiment of the present invention.

In this embodiment, FIG. 9 is a schematic diagram of a drawn image according to an embodiment of the present invention. A TUI identifier corresponding to FIG. 9 is used to identify a TUI template. The TUI template is shown in FIG. 8. The applet in the SE sends the TUI identifier and a service parameter to the TUI agent. The TUI agent sends a TUI call instruction to the SE TA in the TEE. After receiving the TUI call instruction, the SE TA obtains the stored TUI template that is shown in FIG. 8 and that corresponds to the TUI identifier. By using a parameter in the TUI call instruction, an image required by the component 1, content (for example, to-be-signed information such as payee information, payer information, or transaction information) required by a display box of the component 2, and a security indication mark required by the component 4 are provided for the SE TA. Then the SE TA combines the TUI template and the service parameter to draw a TUI image.

In this embodiment, after drawing an image based on the obtained TUI template or TUI function module, the SE TA in the TEE may directly call the TUI module in the TEE to display the drawn image. In an implementation, when the TUI template is executable TUI template code, after the SE TA in the TEE implements a corresponding value assignment operation on the TUI template code by using the parameter in the TUI call instruction, the TUI function may be called by using a standard TUI API interface, and the drawn image is displayed.

206. The TUI in the TEE displays the drawn image, and receives information or an operation entered by the user for the displayed image.

In this embodiment, after the TUI in the TEE displays the drawn image, the user may enter information on a displayed TUI interface according to an instruction, for example, enter a password, or perform an operation such as tapping or sliding on the displayed image as required, for example, tapping an "OK" button or a "No" button. After receiving the information or the operation entered by the user for the displayed image, the TUI in the TEE may send the information or information about an area in which the operation is performed, namely, operated information, to the SE TA in the TEE. For example, if a component button 1 displays content "Yes" and a button 2 displays content "No", when the TUI detects an operation of tapping an area of the button 1 by the user, in other words, tapping "Yes" to determine content by the user, output of the button 1 is "tapped" (value 1), and output of the button 2 is "not tapped" (value 0).

207. The SE TA in the TEE sends response information to the TUI agent in the SE.

In this embodiment, after receiving the information provided by the user by using the TUI, the SE TA in the TEE may directly use the information as the response information and send the information to the TUI agent in the SE. After receiving the operated information from the TUI, the SE TA in the TEE may first generate the response information based on the operation and the operated information, and then send the response information to the TUI agent in the SE. In other words, the response information may be information entered by the user for the displayed image by using the TUI, or may be information generated by the TEE based on interaction between the user and the image displayed by the TUI.

208. The TUI agent in the SE sends the response information to the applet in the SE.

In this embodiment, after receiving the response information from the SE TA in the TEE, the TUI agent in the SE may send the response information to the applet in the SE through broadcasting or a communication mechanism between applets.

209. The applet in the SE executes a corresponding service procedure based on the response information.

In this embodiment, after receiving the response information sent by the TUI agent in the SE, the applet in the SE executes the corresponding service procedure based on the response information. For example, when the response information is that the user taps "Yes", a next operation is performed.

Figure 3:
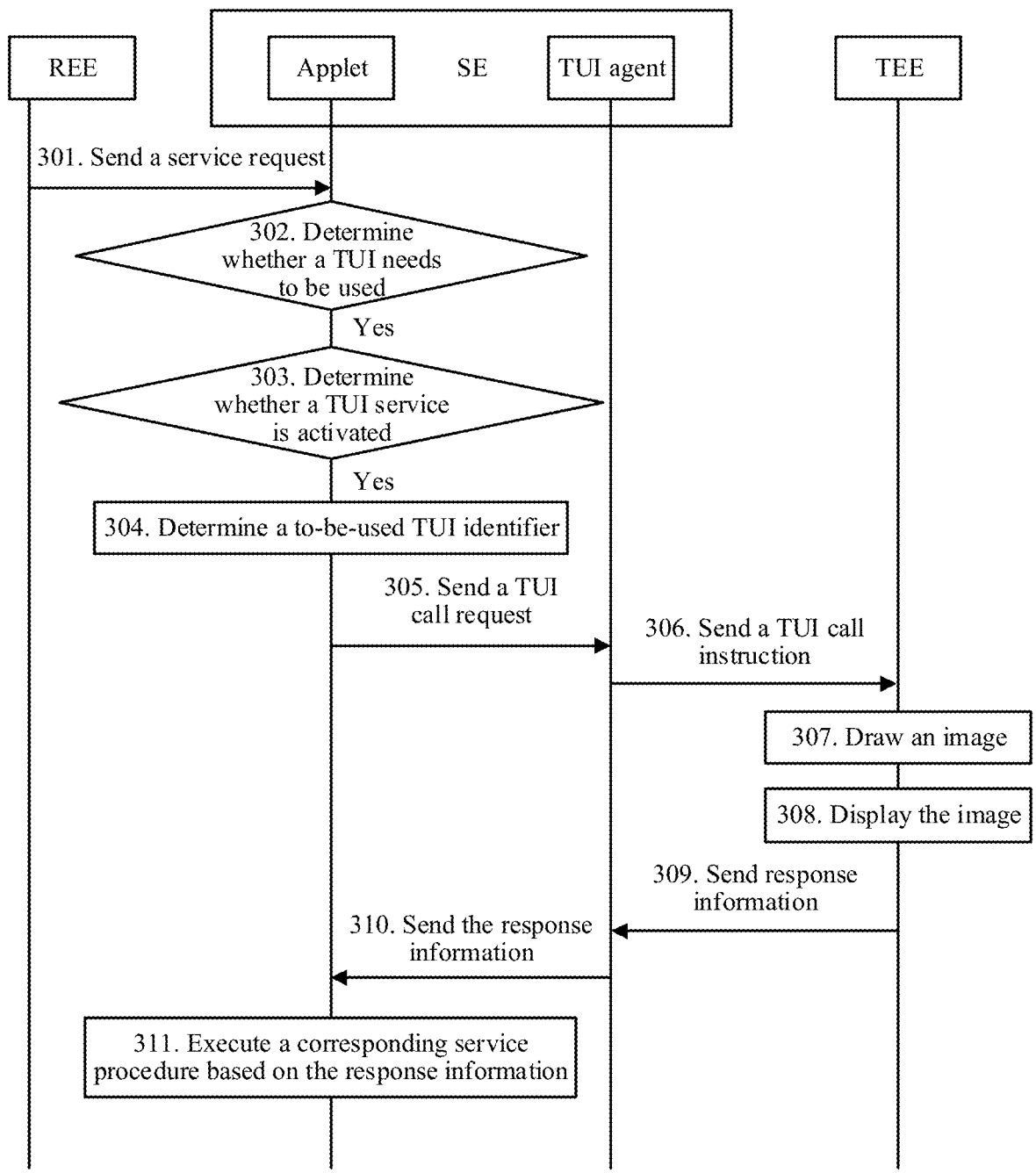
FIG. 3 is a schematic flowchart of another interaction method according to an embodiment of the present invention.

Based on the system architecture shown in FIG. 1, FIG. 3 is a schematic flowchart of another interaction method according to an embodiment of the present invention. As shown in FIG. 3, the interaction method may include the following steps.

301. A CA in an REE sends a service request carrying a service type to an applet in an SE by using an OM API.

Step 301 is the same as step 201. For detailed description, refer to step 201. Details are not described herein again.

302. The applet in the SE determines, based on the service type, whether a TUI needs to be used, and performs step 303 when determining that the TUI needs to be used.

In this embodiment, after receiving the service request, the applet that is in the SE and that corresponds to service information may determine, based on the service type, whether the TUI needs to be used for a current service, and perform step 303 when determining that the TUI needs to be used for the current service or directly execute a procedure required by the service when determining that the TUI does not need to be used for the current service.

303. The applet in the SE determines whether a TUI service of the SE is activated, and performs step 304 when determining that the TUI service is activated.

In this embodiment, when determining that the TUI needs to be used for the current service, the applet that is in the SE and that corresponds to the service information may further determine whether the TUI service of the SE is activated. A determining process may be as follows: The applet in the SE sends a service status query request to a TUI agent in the SE. When the TUI agent has established a connection to an SE TA in a TEE, a message of "activated" may be directly sent to the applet. When the TUI agent has not established a connection to the SE TA in the TEE, the TUI agent may send a connection establishment request to the SE TA to check statuses of the SE TA and the TUI in the TEE. When the SE TA is available, the SE TA sends an establishment complete message to the TUI agent. When the SE TA is unavailable, the SE TA may not respond, or may send a connection failure message to the TUI agent. Still further, the SE TA may send, to the TUI agent, identifiers of all TUI templates stored in the TEE, binding relationships between the templates and each applet, and hash values of the templates. After determining a TUI activation status of the SE, the TUI agent may send a message of "activated" or a message of "not activated" to the applet. After receiving the message, sent by the TUI agent, that the TUI agent is activated, the applet performs step 304. After receiving the message, sent by the TUI agent, that the TUI service is not activated, the applet ends the service, and then may send a service failure message to the CA or may send a service failure reason to the CA. Alternatively, the TUI agent may directly push the message that the TUI service is activated to the applet.

304. The applet in the SE determines a to-be-used TUI identifier.

Step 304 is the same as step 202. For detailed description, refer to step 202. Details are not described herein again.

305. The applet in the SE sends a TUI call request including the determined TUI identifier to the TUI agent in the SE.

Step 305 is the same as step 203. For detailed description, refer to step 203. Details are not described herein again.

306. The TUI agent in the SE sends a TUI call instruction carrying the TUI identifier to the SE TA in the TEE.

Step 306 is the same as step 204. For detailed description, refer to step 204. Details are not described herein again.

307. The SE TA in the TEE obtains a TUI template or a TUI function module corresponding to the TUI identifier, and draws an image based on the obtained TUI template or TUI function module.

Step 307 is the same as step 205. For detailed description, refer to step 205. Details are not described herein again.

308. The TUI in the TEE displays the drawn image, and receives information or an operation entered by a user for the displayed image.

Step 308 is the same as step 206. For detailed description, refer to step 206. Details are not described herein again.

309. The SE TA in the TEE sends response information to the TUI agent in the SE.

Step 309 is the same as step 207. For detailed description, refer to step 207. Details are not described herein again.

310. The TUI agent in the SE sends the response information to the applet in the SE.

Step 310 is the same as step 208. For detailed description, refer to step 208. Details are not described herein again.

311. The applet in the SE executes a corresponding service procedure based on the response information.

Step 311 is the same as step 209. For detailed description, refer to step 209. Details are not described herein again.

Figure 4:
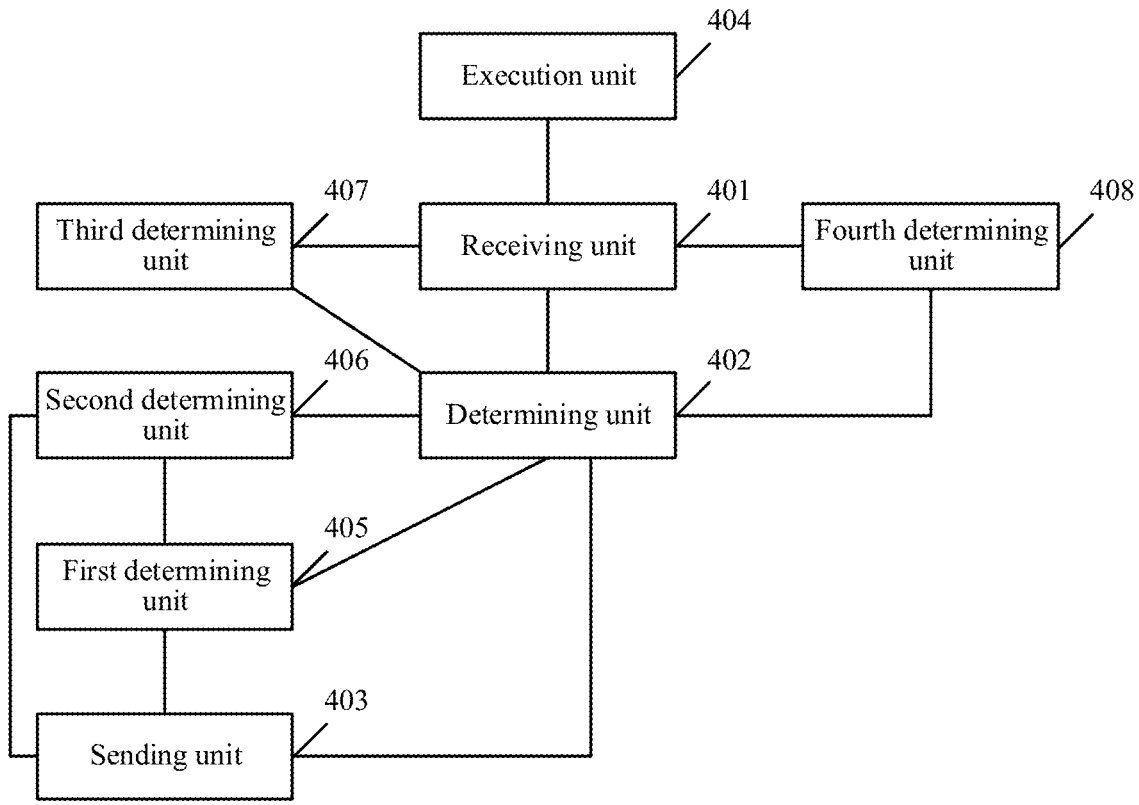
FIG. 4 is a schematic structural diagram of an SE according to an embodiment of the present invention.

Based on the system architecture shown in FIG. 1, FIG. 4 is a schematic structural diagram of an SE according to an embodiment of the present invention. The SE is an SE disposed in a terminal. As shown in FIG. 4, the SE may include:

a receiving unit 401, configured to receive a service request from a CA, where the CA is an application that is installed in the terminal and that runs in an REE;

a determining unit 402, configured to determine a to-be-used TUI identifier;

a sending unit 403, configured to: send a TUI call instruction carrying the TUI identifier selected by the selection unit 402 to a TEE, where the TUI call instruction is used to indicate the TEE to obtain a stored TUI template or TUI function module corresponding to the TUI identifier, draw an image based on the obtained TUI template or TUI function module, and call a TUI to display the image, where the receiving unit 401 is further configured to receive response information from the TEE, where the response information is information entered by a user for the displayed image by using the TUI or information generated by the TEE based on interaction between the user and the image displayed by the TUI; and an execution unit 404, configured to execute a corresponding service procedure based on the response information received by the receiving unit 401.

Specifically, the determining unit 402 is configured to determine the to-be-used TUI identifier based on the service request received by the receiving unit 401.

In a possible implementation, the TUI call instruction further carries a parameter, and the parameter is a parameter required by the TUI template or the TUI function module corresponding to the TUI identifier; and that the TUI call instruction is used to indicate the TEE to draw an image based on the obtained TUI template or TUI function module includes:

the TUI call instruction is used to indicate the TEE to draw an image based on the obtained TUI template or TUI function module and the parameter.

In a possible implementation, the SE may further include:

a first determining unit 405, configured to determine whether there is a binding relationship between an applet and the TUI template that is stored in the TEE and that corresponds to the TUI identifier determined by the determining unit 402, where when the first determining unit 405 determines that there is a binding relationship between the applet and the TUI template that is stored in the TEE and that corresponds to the TUI identifier, the sending unit 403 sends the TUI call instruction carrying the TUI identifier to the TEE, and the applet is an applet receiving the service request.

In a possible implementation, the SE may further include:

a second determining unit 406, configured to: when the first determining unit 405 determines that there is a binding relationship between the applet and the TUI template that is stored in the TEE and that corresponds to the TUI identifier, determine whether the TUI template corresponding to the TUI identifier determined by the determining unit 402 is tampered with, where when the second determining unit 406 determines that the TUI template corresponding to the TUI identifier is not tampered with, the sending unit 403 sends the TUI call instruction carrying the TUI identifier to the TEE.

In a possible implementation, the TUI call request further carries an applet identifier of an applet receiving the service request, and the TUI call instruction is further used to indicate the TEE to determine whether there is a binding relationship between the applet corresponding to the applet identifier and the obtained TUI template and draw an image based on the obtained TUI template when it is determined that there is a binding relationship between the applet corresponding to the applet identifier and the obtained TUI template.

In a possible implementation, the TUI call instruction is further used to indicate the TEE to determine, when the TEE determines that there is a binding relationship between the applet corresponding to the applet identifier and the obtained TUI template, whether the obtained TUI template is tampered with and draw an image based on the obtained TUI template when it is determined that the obtained TUI template is not tampered with.

In a possible implementation, the SE may further include:

a third determining unit 407, configured to: after the receiving unit 401 receives the service request from the CA, determine whether a TUI service of the SE is activated, where when the third determining unit 407 determines that the TUI service is activated, the determining unit 402 determines the to-be-used TUI identifier.

In a possible implementation, the service request carries a service type, and the SE may further include:

a fourth determining unit 408, configured to determine, based on the service type received by the receiving unit 401, whether the TUI needs to be used, where when it is determined that the TUI needs to be used, the third determining unit 407 determines whether the TUI service of the SE is activated, or the determining unit 402 determines the to-be-used TUI identifier.

In addition, the SE may further perform the method steps performed by the SE in FIG. 2 and FIG. 3, and may further include another unit for performing the method steps performed by the SE in FIG. 2 and FIG. 3. Details are not described herein.

Figure 5:
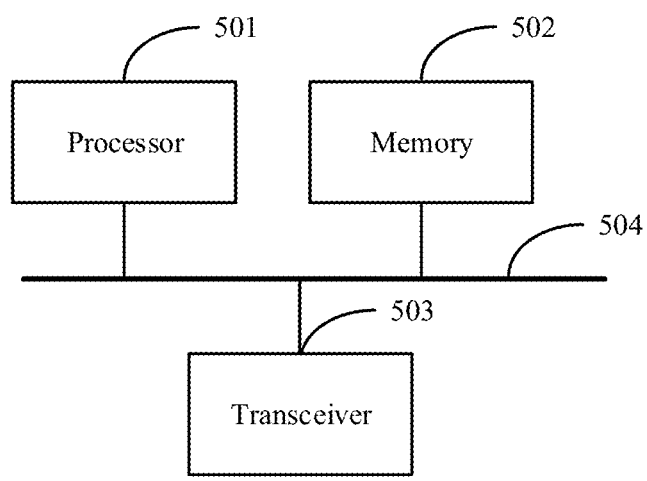
FIG. 5 is a schematic structural diagram of another SE according to an embodiment of the present invention.

Based on the system architecture shown in FIG. 1, FIG. 5 is a schematic structural diagram of another SE according to an embodiment of the present invention. The SE is an SE disposed in a terminal. As shown in FIG. 5, the SE may include a processor 501, a memory 502, a transceiver 503, and a bus 504. The processor 501 may be a general-purpose central processing unit (CPU), a plurality of CPUs, a microprocessor, an application-specific integrated circuit (application-specific integrated circuit, ASIC), or one or more integrated circuits that are configured to control program execution of solutions of the present invention. The memory 502 may be a read-only memory (read-only memory, ROM) or another type of static storage device that can store static information and instructions, or a random access memory (random access memory, RAM) or another type of dynamic storage device that can store information and instructions; or may be an electrically erasable programmable read-only memory (Electrically Erasable Programmable Read-Only Memory, EEPROM), a compact disc read-only memory (Compact Disc Read-Only Memory, CD-ROM) or another compact disk storage, an optical disc storage (including a compact optical disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, this is not limited thereto. The memory 502 may exist alone, and the bus 504 is connected to the processor 501. Alternatively, the memory 502 may be integrated with the processor 501. The bus 504 may include a channel for transmitting information between the foregoing components.

The transceiver 503 is configured to receive a service request from a CA, where the CA is an application that is installed in the terminal and that runs in an REE.

The memory 502 stores a set of program code, and the processor 501 is configured to invoke the program code stored in the memory 502 to perform the following operation:

determining a to-be-used TUI identifier.

The transceiver 503 is further configured to: send a TUI call instruction carrying the TUI identifier to a TEE, where the TUI call instruction is used to indicate the TEE to obtain a stored TUI template or TUI function module corresponding to the TUI identifier, draw an image based on the obtained TUI template or TUI function module, and call a TUI to display the drawn image.

The transceiver 503 is further configured to receive response information from the TEE, where the response information is information entered by a user for the displayed image by using the TUI or information generated by the TEE based on interaction between the user and the image displayed by the TUI.

The processor 501 is further configured to invoke the program code stored in the memory 502 to perform the following operation:

executing a corresponding service procedure based on the response information.

In a possible implementation, the TUI call instruction further carries a parameter, and the parameter is a parameter required by the TUI template or the TUI function module corresponding to the determined TUI identifier; and that the TUI call instruction is used to indicate the TEE to draw an image based on the obtained TUI template or TUI function module includes:

the TUI call instruction is used to indicate the TEE to draw an image based on the obtained TUI template or TUI function module and the parameter.

In a possible implementation, the processor 501 is further configured to invoke the program code stored in the memory 502 to perform the following operation:

determining whether there is a binding relationship between an applet and the TUI template that is stored in the TEE and that corresponds to the TUI identifier, where when it is determined that there is a binding relationship between the applet and the TUI template that is stored in the TEE and that corresponds to the TUI identifier, the transceiver 503 sends the TUI call instruction carrying the TUI identifier to the TEE, where the applet is an applet receiving the service request.

In a possible implementation, the processor 501 is further configured to invoke the program code stored in the memory 502 to perform the following operation:

when there is a binding relationship between the applet and the TUI template that is stored in the TEE and that corresponds to the TUI identifier, determining whether the TUI template corresponding to the TUI identifier is tampered with, where when it is determined that the TUI template corresponding to the TUI identifier is not tampered with, the transceiver 503 sends the TUI call instruction carrying the TUI identifier to the TEE.

In a possible implementation, the TUI call request further carries an applet identifier of an applet receiving the service request, and the TUI call instruction is further used to indicate the TEE to determine whether there is a binding relationship between the applet corresponding to the applet identifier and the obtained TUI template and draw an image based on the obtained TUI template when it is determined that there is a binding relationship between the applet corresponding to the applet identifier and the obtained TUI template.

In a possible implementation, the TUI call instruction is further used to indicate the TEE to determine, when the TEE determines that there is a binding relationship between the applet corresponding to the applet identifier and the obtained TUI template, whether the obtained TUI template is tampered with and draw an image based on the obtained TUI template when it is determined that the obtained TUI template is not tampered with.

In a possible implementation, the processor 501 is further configured to invoke the program code stored in the memory 502 to perform the following operations:

after the transceiver 503 receives the service request from the CA, determining whether a TUI service of the SE is activated, and when it is determined that the TUI service is activated, determining the to-be-used TUI identifier.

In a possible implementation, the service request carries a service type, and the processor 501 is further configured to invoke the program code stored in the memory 502 to perform the following operations:

determining, based on the service type, whether the TUI needs to be used, and when it is determined that the TUI needs to be used, determining whether the TUI service of the SE is activated or determining the to-be-used TUI identifier.

Step 202, step 203, step 209, step 210, step 302 to step 305, step 311, and step 312 may be performed by the processor 501 and the memory 502 in the SE. The step of receiving the service request from the CA by the applet in the SE, step 204, the receiving step in step 208, step 306, and the receiving step in step 310 may be performed by the transceiver 503 in the SE.

The determining unit 402, the execution unit 404, the first determining unit 405, the second determining unit 406, the third determining unit 407, and the fourth determining unit 408 may be implemented by the processor 501 and the memory 502 in the SE, and the steps of the receiving unit 401 and the sending unit 403 may be implemented by the transceiver 503 in the SE.

Figure 6:
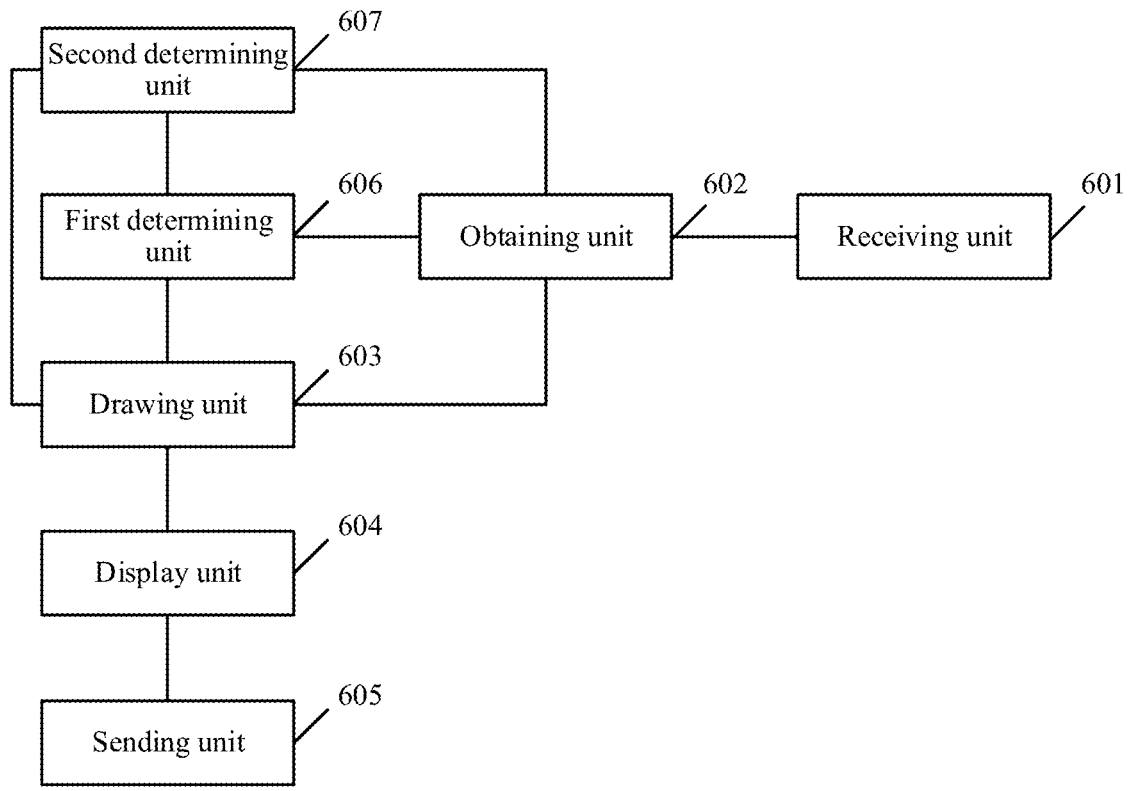
FIG. 6 is a schematic structural diagram of a TEE according to an embodiment of the present invention.

Based on the system architecture shown in FIG. 1, FIG. 6 is a schematic structural diagram of a TEE according to an embodiment of the present invention. The TEE is a TEE in a terminal. As shown in FIG. 6, the TEE may include:

a receiving unit 601, configured to receive a TUI call instruction from an SE, where the TUI call instruction carries a TUI identifier;

an obtaining unit 602, configured to obtain a stored TUI template or TUI function module corresponding to the TUI identifier received by the receiving unit 601;

a drawing unit 603, configured to draw an image based on the TUI template or the TUI function module obtained by the obtaining unit 602;

a display unit 604, configured to call a TUI to display the image drawn by the drawing unit 603; and a sending unit 605, configured to send response information to the SE, where the response information is information entered by a user by using the TUI for the image displayed by the display unit 604 or generated based on interaction between the user and the image displayed by the display unit 604 by using the TUI, and the response information is used to indicate the SE to execute a corresponding service procedure based on the response information.

In a possible implementation, the TUI call instruction further carries a parameter; and the drawing unit 603 is specifically configured to draw an image based on the obtained TUI template or TUI function module and the parameter.

In a possible implementation, the TUI template stored in the TEE is:

a TUI template from the SE; or a TUI template from a server; or a preset TUI template.

In a possible implementation, when the TUI template is a TUI template from the SE or the server, the TUI call request further carries an applet identifier of an applet that is in the SE and that receives a service request; and the TEE may further include:

a first determining unit 606, configured to determine whether there is a binding relationship between the TUI template obtained by the obtaining unit 602 and the applet corresponding to the applet identifier, where when it is determined that there is a binding relationship between the obtained TUI template and the applet corresponding to the applet identifier, the drawing unit 603 draws an image based on the obtained TUI template.

In a possible implementation, the TEE may further include:

a second determining unit 607, configured to: when the first determining unit 606 determines that there is a binding relationship between the obtained TUI template and the applet corresponding to the applet identifier, determine whether the TUI template obtained by the obtaining unit 602 is tampered with, where when it is determined that the obtained TUI template is not tampered with, the drawing unit 603 draws an image based on the obtained TUI template.

In addition, the TEE may further perform the method steps performed by the TEE in FIG. 2 and FIG. 3, and may further include another unit for performing the method steps performed by the TEE in FIG. 2 and FIG. 3. Details are not described herein.

Figure 7:
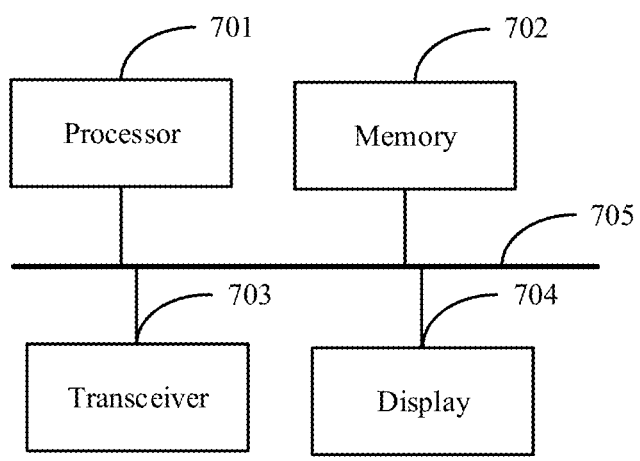
FIG. 7 is a schematic structural diagram of another TEE according to an embodiment of the present invention.

Based on the system architecture shown in FIG. 1, FIG. 7 is a schematic structural diagram of another TEE according to an embodiment of the present invention. The TEE is a TEE in a terminal. As shown in FIG. 7, the TEE may include a processor 701, a memory 702, a transceiver 703, a display 704, and a bus 705. The processor 701 may be a general-purpose central processing unit (CPU), a plurality of CPUs, a microprocessor, an application-specific integrated circuit (application-specific integrated circuit, ASIC), or one or more integrated circuits that are configured to control program execution of solutions of the present invention. The memory 702 may be a read-only memory (read-only memory, ROM) or another type of static storage device that can store static information and instructions, or a random access memory (random access memory, RAM) or another type of dynamic storage device that can store information and instructions; or may be an electrically erasable programmable read-only memory (Electrically Erasable Programmable Read-Only Memory, EEPROM), a compact disc read-only memory (Compact Disc Read-Only Memory, CD-ROM) or another compact disk storage, an optical disc storage (including a compact optical disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, this is not limited thereto. The memory 702 may exist alone, and the bus 705 is connected to the processor 701. Alternatively, the memory 702 may be integrated with the processor 701. The bus 705 may include a channel for transmitting information between the foregoing components. The transceiver 703 may be a transceiver antenna, or may be another transceiver component.

The transceiver 703 is configured to receive a TUI call instruction from an SE, where the TUI call instruction carries a TUI identifier.

The memory 702 stores a set of program code, and the processor 701 is configured to invoke the program code stored in the memory 702 to perform the following operations:

obtaining a stored TUI template or TUI function module corresponding to the TUI identifier; and drawing an image based on the obtained TUI template or TUI function module.

The display 704 is configured to call a TUI to display the drawn image.

The transceiver 703 is further configured to send response information to the SE, where the response information is information entered by a user for the displayed image by using the TUI or information generated based on interaction between the user and the image displayed by the TUI, and the response information is used to indicate the SE to execute a corresponding service procedure based on the response information.

In a possible implementation, the TUI call instruction further carries a parameter; and that the processor 701 draws an image based on the obtained TUI template or TUI function template includes:

drawing an image based on the obtained TUI template or TUI function module and the parameter.

In a possible implementation, the TUI template stored in the TEE is:

a TUI template from the SE; or a TUI template from a server; or a preset TUI template.

In a possible implementation, when the TUI template is a TUI template from the SE or the server, the TUI call request further carries an applet identifier of an applet that is in the SE and that receives a service request; and the processor 701 is further configured to invoke the program code stored in the memory 702 to perform the following operations:

determining whether there is a binding relationship between the obtained TUI template and the applet corresponding to the applet identifier, and when it is determined that there is a binding relationship between the obtained TUI template and the applet corresponding to the applet identifier, drawing an image based on the TUI template.

In a possible implementation, the processor 701 is further configured to invoke the program code stored in the memory 702 to perform the following operations:

when it is determined that there is a binding relationship between the obtained TUI template and the applet corresponding to the applet identifier, determining whether the obtained TUI template is tampered with, and when it is determined that the obtained TUI template is not tampered with, drawing an image based on the TUI template.

The receiving and sending steps in step 205 to step 207 and the receiving and sending steps in step 307 to step 309 may be performed by the processor 701 and the memory 702 in the TEE, the step of receiving the TUI call instruction by the SE TA in the TEE, step 208, and step 310 may be performed by the transceiver 703 in the TEE, and the display step in step 207 and step 309 may be performed by the display 704 in the TEE.

The obtaining unit 602, the drawing unit 603, the first determining unit 606, and the second determining unit 607 may be implemented by the processor 701 and the memory 702 in the TEE, the receiving unit 601 and the sending unit 605 may be implemented by the transceiver 703 in the TEE, and the display unit 604 may be implemented by the display 704 in the TEE.

An embodiment of the present invention further discloses a readable storage medium. The readable storage medium stores programs, and when the programs run, the interaction methods shown in FIG. 2 and FIG. 3 are implemented.

A person skilled in the art should be aware that in the foregoing one or more examples, functions described in the present invention may be implemented by hardware, software, firmware, or any combination thereof. When the present invention is implemented by software, the foregoing functions may be stored in a computer readable medium or transmitted as one or more instructions or code in the computer readable medium. The computer readable medium includes a computer storage medium and a communications medium. The communications medium includes any medium that enables a computer program to be transmitted from one place to another. The storage medium may be any available medium accessible to a general-purpose or dedicated computer.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made on the basis of the technical solutions of the present invention shall fall within the protection scope of the present invention.

What is claimed is:

1. A method implemented by a secure element (SE) disposed in a terminal, wherein the method comprises:
   receiving a service request from a client application (CA) that is installed on the terminal and that runs in a rich execution environment (REE);
   determining a trusted user interface (TUI) identifier;
   sending a TUI call instruction comprising the TUI identifier to a trusted execution environment (TEE), wherein the TUI call instruction instructs the TEE to obtain a TUI template or a TUI function component corresponding to the TUI identifier draw an image based on the TUI template or the TUI function component, and call a TUI to display the image;
   receiving, from the TEE, response information from a user for the image using the TUI or information based on interaction between the user and the image; and
   executing a corresponding service procedure based on the response information.

2. The method of claim 1, wherein the TUI call instruction further comprises a parameter for the TUI template or the TUI function component, and wherein the TUI call instruction further instructs the TEE to draw the image based on the parameter.

3. The method of claim 1, further comprising:
   determining whether a binding relationship exists between an applet and the TUI template, wherein the applet receives the service request; and
   sending the TUI call instruction comprising the TUI identifier to the TEE when the binding relationship exists.

4. The method of claim 3, wherein the binding relationship exists, and wherein the method further comprises:
- determining whether the TUI template is tampered with; and
- further sending the TUI call instruction comprising the TUI identifier to the TEE when the TUI template is not tampered with.

5. The method of claim 1, wherein the TUI call instruction further comprises an applet identifier of an applet receiving the service request, and wherein the TUI call instruction further indicates the TEE to determine whether a binding relationship exists between the applet and the TUI template and to draw the image based on the TUI template when the binding relationship exists.

6. The method of claim 5, wherein the binding relationship exists, and wherein the TUI call instruction further instructs the TEE to determine whether the TUI template is tampered with and further to draw the image based on the TUI template when the TUI template is not tampered with.

7. The method of claim 1, wherein after receiving the service request, the method further comprises:
- determining whether a TUI service of the SE is activated; and
- determining the TUI identifier when the TUI service is activated.

8. The method of claim 7, wherein the service request comprises a service type, and wherein the method further comprises:
- determining, based on the service type, whether the TUI is to be used; and
- performing, when the TUI is to be used, one of determining whether the TUI service is activated or determining the TUI identifier.

9. A method implemented by a trusted execution environment (TEE) in a terminal, wherein the method comprises:
- receiving, from a secure element (SE), a trusted user interface (TUI) call instruction comprising a TUI identifier;
- obtaining a TUI template or a TUI function component corresponding to the TUI identifier;
- drawing an image based on the TUI template or the TUI function component;
- calling a TUI to display the image;
- receiving, from a user, response information for the image using the TUI or information generated based on interaction between the user and the image; and
- sending, to the SE, the response information to instruct the SE to execute a corresponding service procedure based on the response information.

10. The method of claim 9, wherein the TUI call instruction further comprises a parameter, and wherein the method further comprises drawing the image based on the parameter.

11. The method of claim 9, wherein the TUI component comprises:
- a first TUI template from the SE;
- a second TUI template from a server; or
- a preset TUI template.

12. The method of claim 11, wherein when the TUI template comprises the first TUI template or the second TUI template, the TUI call request further comprises an applet identifier of an applet in the SE that receives a service request, and wherein the method further comprises:
- determining whether a binding relationship exists between the TUI template and the applet; and
- drawing the image based on the TUI template when the binding relationship exists.

13. The method of claim 12, wherein the binding relationship exists, and wherein the method further comprises:
- determining whether the TUI template is tampered with; and
- drawing the image based on the TUI template when the TUI template is not tampered with.

14. A secure element (SE) disposed in a terminal and comprising:
- a transceiver configured to receive a service request from a client application (CA) installed on the terminal and that runs a rich execution environment (REE);
- a processor coupled to the transceiver and configured to determine a trusted user interface (TUI) identifier,
- wherein the transceiver is further configured to:
  - send a TUI call instruction comprising the TUI identifier to a trusted execution environment (TEE), wherein the TUI call instruction instructs the TEE to obtain a TUI template or a TUI function component corresponding to the TUI identifier, draw an image based on the TUI template or the TUI function component, and call a TUI to display the image; and
  - receive, from the TEE, response information from a user for the image using the TUI or information based on interaction between the user and the image, and
- wherein the processor is further configured to execute a corresponding service procedure based on the response information.

15. The SE of claim 14, wherein the TUI call instruction further comprises a parameter for the TUI template or the TUI function component, and wherein the TUI call instruction further instructs the TEE to draw the image based on the parameter.

16. The SE of claim 14, wherein the processor is further configured to determine whether a binding relationship exists between an applet and the TUI template, wherein the applet receives the service request, and wherein the transceiver is further configured to send the TUI call instruction comprising the TUI identifier to the TEE when the binding relationship exists.

17. The SE of claim 16, wherein the binding relationship exists, wherein the processor is further configured to determine whether the TUI template is tampered with, and wherein the transceiver is further configured to send the TUI call instruction comprising the TUI identifier to the TEE when the TUI template is not tampered with.

18. The SE of claim 14, wherein the TUI call request further comprises an applet identifier of an applet receiving the service request, and wherein the TUI call instruction further instructs the TEE to determine whether a binding relationship exists between the applet and the TUI template and to draw the image based on the TUI template when the binding relationship exists.

19. The SE of claim 18, wherein the binding relationship exists, and wherein the TUI call instruction further instructs the TEE to determine whether the TUI template is tampered with and to draw the image based on the TUI template when the TUI template is not tampered with.

20. The SE of claim 14, wherein after receiving the service request, the processor is further configured to:
- determine whether a TUI service of the SE is activated; and
- determine the TUI identifier when the TUI service is activated.

* * * * *